T. J. BOTTOMLEY.

Tug-Holders.

No. 5,657. Reissued Nov. 18, 1873.

Jno J. Bohner
George J. Melzger } Witnesses.

Thos J. Bottomley. Inventor.
By Jay Hyatt
Atty

AM. PHOTO-LITHOGRAPHIC Co. N.Y. (OSBORNE'S PROCESS)

UNITED STATES PATENT OFFICE.

THOMAS J. BOTTOMLEY, OF BURLINGTON, WISCONSIN, ASSIGNOR TO PRATT & LETCHWORTH, OF BUFFALO, NEW YORK.

IMPROVEMENT IN TUG-HOLDERS.

Specification forming part of Letters Patent No. 67,489, dated August 6, 1867; reissue No. 5,657, dated November 18, 1873; application filed August 18, 1873.

*To all whom it may concern:*

Be it known that I, THOMAS J. BOTTOMLEY, of Burlington, in the county of Racine and State of Wisconsin, have invented a Tug-Holder or Trace-Carrier, of which the following is a specification:

The invention consists of an attachment to harness of horses, whereby the tugs or traces, when unhitched from the whiffletree, are securely held up and carried free from the ground, and out of the way of the horse's feet and legs.

Figure 1:
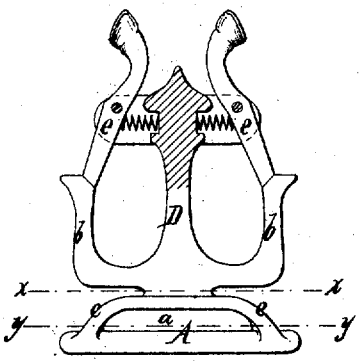
Figure 3:
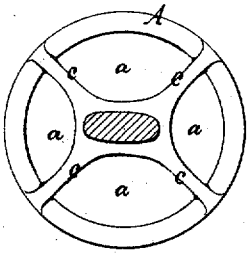
Figure 2:
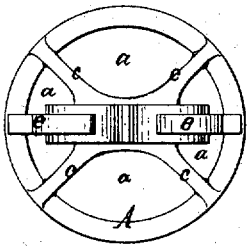
Figure 4:
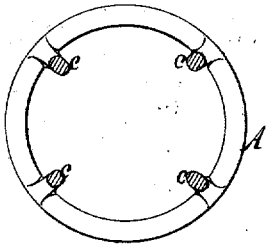

In the accompanying drawings, Figure 1 is a side elevation of my attachment. Fig. 2 is a plan; and Figs. 3 and 4 are horizontal sections in lines *x x* and *y y*, Fig. 1.

Like letters of reference designate like parts in each of the figures.

As represented in the drawings, A is the base-ring. *b b* are two trace-carrying arms, supported by four legs, *c c*, connecting with the base A. D is a central post, in the upper end of which is pivoted two spring arms or levers *e e*, the free ends of which connect with the trace-carriers *b*, and form a bridge over the space between the said trace-carriers.

My trace carrier or holder is designed to be attached to the back or crupper strap of harness, at or near the point where the hip-straps connect with or cross the same. The portions *a a* of the base-ring, between the points where the legs *c* connect therewith, form means for readily attaching or securing my holder to the harness.

The eyes of the tugs or traces are engaged with the carriers *b* by pressing them against the spring-arms *e* so as to swing the latter inward, when the return of the spring-arms to their normal position prevents the accidental detachment of the tugs from the carriers *b*, which support them.

I do not intend to limit myself to the particular form and construction of the parts shown in the accompanying drawings; but

What I claim as my invention is—

1. The combination of two trace-carrying arms with a base, A, provided with loops *a a a a*, substantially as hereinbefore set forth.

2. The combination, with the base and tug-supporting arms of a trace-carrier, of the spring locking-arms *e e*, substantially as and for the purpose hereinbefore set forth.

THOMAS J. BOTTOMLEY.

Witnesses:

HARVEY D. BLAKESLEE,
LOUISA NOBLE.